(12) United States Patent
Ohshima

(10) Patent No.: US 8,727,598 B2
(45) Date of Patent: May 20, 2014

(54) PLANAR LIGHT SOURCE DEVICE, LIQUID CRYSTAL DISPLAY DEVICE, AND TELEVISION SET

(75) Inventor: Yoshinori Ohshima, Chiba (JP)

(73) Assignee: Panasonic Liquid Crystal Display, Ltd., Hyogo (JP)

( * ) Notice: Subject to any disclaimer, the term of this patent is extended or adjusted under 35 U.S.C. 154(b) by 133 days.

(21) Appl. No.: 13/408,670

(22) Filed: Feb. 29, 2012

(65) Prior Publication Data

US 2012/0224111 A1    Sep. 6, 2012

(30) Foreign Application Priority Data

Mar. 1, 2011  (JP) .................................. 2011-044398

(51) Int. Cl.
     *F21V 7/04*  (2006.01)
(52) U.S. Cl.
     USPC .......... 362/615; 362/609; 362/346; 362/97.1; 349/58; 349/61
(58) Field of Classification Search
     USPC ............ 362/296.09, 609, 346, 612, 613, 615, 362/235, 296.01, 297, 611, 97.3, 97.1, 97.2, 362/311.02, 624, 555, 561, 608, 339, 241; 349/58, 61–65, 113
     See application file for complete search history.

(56) References Cited

U.S. PATENT DOCUMENTS

| | | | |
|---|---|---|---|
| 2005/0265029 A1* | 12/2005 | Epstein et al. ................ | 362/339 |
| 2006/0290844 A1* | 12/2006 | Epstein et al. ................ | 349/113 |
| 2007/0002565 A1* | 1/2007 | Han et al. ....................... | 362/240 |
| 2007/0121340 A1 | 5/2007 | Hoshi | |
| 2010/0238686 A1* | 9/2010 | Weber et al. .................. | 362/609 |
| 2011/0249446 A1* | 10/2011 | Epstein et al. ............ | 362/296.09 |
| 2012/0218752 A1* | 8/2012 | Sumitani ....................... | 362/235 |

FOREIGN PATENT DOCUMENTS

| | | |
|---|---|---|
| JP | 2001-133779 | 5/2001 |
| JP | 2002-298629 | 10/2002 |
| JP | 2007-149451 | 6/2007 |

\* cited by examiner

*Primary Examiner* — Anh Mai
*Assistant Examiner* — Kevin Quarterman
(74) *Attorney, Agent, or Firm* — Hamre, Schumann, Mueller & Larson, P.C.

(57) ABSTRACT

In a direct type backlight device of a liquid crystal display device, a light guide plate is used obtain a uniform in-plane distribution of light emission intensity. A reflective sheet (62) having an opening portion is laminated on a front surface of an LED substrate (60), and an LED element (74) is accommodated inside the opening portion. A light guide plate (64) is stacked on the reflective sheet (62). On a front surface of the light guide plate (64), a white reflective film (90) is formed in a non-total reflection region, which is positioned to oppose the LED element (74) and in which an incident angle of light emitted from the LED element (74) to the front surface is smaller than a critical angle. On a rear surface of the light guide plate (64), a pattern made of a white reflective film (92) is formed.

7 Claims, 8 Drawing Sheets

PLANAR LIGHT SOURCE DEVICE, LIQUID CRYSTAL DISPLAY DEVICE, AND TELEVISION SET

CROSS-REFERENCE TO RELATED APPLICATION

The present application claims priority from Japanese application JP 2011-044398 filed on Mar. 1, 2011, the content of which is hereby incorporated by reference into this application.

BACKGROUND OF THE INVENTION

1. Field of the Invention

The present invention relates to a planar light source device, a liquid crystal display device, and a television set, and more particularly, to a technology of using a light guide plate to obtain planar light emission from a non-planar light source such as a light emitting diode (LED).

2. Description of the Related Art

Liquid crystal display devices are used for personal computer displays, liquid crystal television sets, and the like. In the liquid crystal display device, each pixel of a liquid crystal panel for forming an image does not emit light by itself. Accordingly, the liquid crystal display device includes a light source for irradiating the liquid crystal panel with light, and the image formed by the liquid crystal panel is made visible for display by means of transmitted light or reflected light from the liquid crystal panel. An example of the light source that can be used is a planar light source called a backlight device disposed behind the liquid crystal panel. In this case, an image is displayed by the transmitted light from the liquid crystal panel.

The backlight device typically uses a large number of point light sources or linear light sources (hereinafter, collectively referred to as non-planar light sources). The backlight device spreads light emitted from the non-planar light sources in a planar manner by means of a light guide plate or the like, and extracts the light from one surface (exit-side surface) of the light guide plate. The planar light source device using the light guide plate is divided into a so-called edge-light type or side-light type in which the non-planar light sources are disposed on a side end surface of the light guide plate, and a so-called direct type in which the non-planar light sources are arrayed along an opposite surface of the exit-side surface (incident-side surface) of the light guide plate. As the non-planar light sources, cold cathode fluorescent lamps (CCFLs) or LEDs are used.

FIG. 13 is a vertical cross-sectional view schematically illustrating a structure of a conventional direct type planar light source device. In the direct type planar light source device, a plurality of light emitting elements 4 are disposed on a substrate 6, and a light guide plate 2 is stacked on the substrate 6. In the structure illustrated in FIG. 13, a recess portion 8 is formed in a lower surface of the light guide plate 2, and the light emitting elements 4 arrayed on the substrate 6 are each accommodated within the recess portion 8. On the other hand, a recess portion 10 having a tapered shape is formed in an upper surface of the light guide plate 2 at a position immediately above the light emitting element 4. Inclined surfaces constituting the tapered shape are formed so as to satisfy conditions of total reflection for light which is emitted from the light emitting element 4 and directs upward. That is, the light is totally reflected on the inclined surfaces so as not to transmit through the light guide plate 2 but to be guided into the light guide plate 2. FIG. 14 is a partial vertical cross-sectional view schematically illustrating another structure of the conventional direct type planar light source device. Also in this structure, a tapered recess portion 10 is formed in the upper surface of the light guide plate 2 at the position immediately above the light emitting element 4 so that the light which is emitted from the light emitting element 4 and directs upward may be reflected into the light guide plate 2, to thereby prevent the transmission of the light. The light that has been guided into the light guide plate 2 is repeatedly totally reflected on the upper and lower surfaces so as to spread within the plane. Further, a white reflective film for diffusing and reflecting light is formed on the lower surface of the light guide plate 2 in the form of halftone dots so that a light component that exits from the upper surface of the light guide plate 2 may be generated at the portion in which the white reflective film is formed. The density and size of the halftone dots at the respective points on the lower surface are designed so that the intensity of light emission from the upper surface of the light guide plate 2 may be uniform.

SUMMARY OF THE INVENTION

In the direct type planar light source device, the plurality of light emitting elements are arrayed behind the light guide plate. In the light guide plate having the recess portions formed in the upper or lower surface thereof, light which is emitted from one light emitting element is prevented from propagating by a recess portion above another light emitting element, which is positioned in the propagating direction of the light. Therefore, for example, in the case where local dimming control is performed on a large number of LEDs which are arrayed two-dimensionally behind the light guide plate, there has been a problem in that, when another LED in the vicinity of a turned-ON LED is turned OFF, a shade appears behind the turned-OFF LED as seen from the turned-ON LED, with the result that unevenness occurs in the intensity of light emission from the upper surface of the light guide plate.

Further, in the structure illustrated in FIG. 13, in which the LED mounted on the substrate is accommodated in the recess portion provided in the lower surface of the light guide plate, if the light guide plate undergoes expansion due to heat generated by the LED or the like, a difference occurs between an interval of the LED array mounted on the substrate and an interval of the recess portions formed in the light guide plate. As a result, a deviation occurs between the positions of the recess portions in the upper and lower surfaces of the light guide plate and the position of the LED. FIG. 15 is a vertical cross-sectional view schematically illustrating the state in which the deviation occurs in the structure illustrated in FIG. 13. In FIG. 15, as a result of the thermal expansion of the light guide plate 2, the recess portions 8 and 10 are deviated to the left with respect to the left LED (light emitting element 4) and are deviated to the right with respect to the right LED (light emitting element 4). The positional deviation changes an incident angle of light emitted by the LED with respect to the inclined surface of the recess portion 10. As a result, a light component that does not satisfy the total reflection conditions at the inclined surface is generated. In other words, there has been a problem in that the light component transmits through the light guide plate 2 and deteriorates the uniformity of the light emission intensity of the planar light source device.

The positional deviation due to the thermal expansion causes another problem in that the light emitting element 4 may be brought into contact with the lower recess portion 8. The positional deviation due to the thermal expansion accumulates and becomes larger as the distance in the surface of the light guide plate is larger. Therefore, as the planar light source device has a larger area, the fear of contact between the light emitting element 4 and the recess portion 8 becomes larger. Further, the contact is responsible for a failure because a stress to be generated in the light guide plate 2, the light emitting element 4, and other members is increased due to the contact. In addition, if the opening area of the recess portion 8 is increased for avoiding this problem, the above-mentioned unevenness of the light emission intensity during local dimming is increased.

The present invention has been made to solve the above-mentioned problems, and provides a planar light source device capable of obtaining an appropriate light emission intensity distribution by employing a structure less susceptible to local dimming control and thermal expansion of a light guide plate, and also provides a liquid crystal display device and a television set that use the planar light source device.

A planar light source device according to an aspect of the present invention includes: a light emitting portion including an element array surface on which a plurality of light emitting elements are arrayed; and a light guide plate having both flat surfaces, the light guide plate being stacked on the element array surface and structured to cause light which is emitted by the plurality of light emitting elements to an incident-side surface to propagate inside the light guide plate so as to extract the light from an exit-side surface which is opposite to the incident-side surface, in which: the element array surface of the light emitting portion has a plurality of recess portions for accommodating the plurality of light emitting elements therein; the exit-side surface of the light guide plate is processed so that at least a part of light emitted from the plurality of light emitting elements toward the exit-side surface is reflected onto each of non-total reflection regions, which is positioned to oppose each of the plurality of light emitting elements and in which an incident angle of the light is smaller than a critical angle; and the incident-side surface of the light guide plate is processed so as to diffuse and reflect light.

In the planar light source device according to another aspect of the present invention, the light emitting portion includes: a substrate for mounting the plurality of light emitting elements thereon; and a reflective sheet, which is laminated on the substrate and has a surface that reflects light, and the reflective sheet has a thickness larger than a thickness of each of the plurality of light emitting elements, and has through holes formed in a surface thereof corresponding to positions of the plurality of light emitting elements, the through holes constituting the plurality of recess portions, respectively.

In the planar light source device according to the above-mentioned aspect of the present invention, the light guide plate may have white reflective films formed on the exit-side surface and the incident-side surface as the processing performed on the exit-side surface and the incident-side surface. The white reflective film formed on the incident-side surface may change a surface density thereof depending on a distance from each of the plurality of light emitting elements so that intensity of light emission from the exit-side surface becomes uniform irrespective of the distance. Further, the white reflective film formed on the exit-side surface in the non-total reflection region may have a pattern of transmitting a part of light emitted from each of the plurality of light emitting elements, and reflecting remaining light, and the white reflective film formed on the incident-side surface may change a surface density thereof depending on a distance from each of the plurality of light emitting elements so that intensity of light emission from the exit-side surface including the transmitted light from the non-total reflection region becomes uniform irrespective of the distance.

In the planar light source device according to the above-mentioned aspect of the present invention, the plurality of light emitting elements may be light emitting diodes.

In the planar light source device according to still another aspect of the present invention, the processing for the non-total reflection region is performed on a region where the non-total reflection region can shift on the exit-side surface due to thermal expansion of the light guide plate.

A liquid crystal display device according to the present invention includes: the planar light source device according to the above-mentioned aspect of the present invention; and a liquid crystal panel for performing display by being irradiated with light from the planar light source device.

A television set according to the present invention includes the liquid crystal display device according to the present invention.

DETAILED DESCRIPTION OF THE INVENTION

Figure 1:
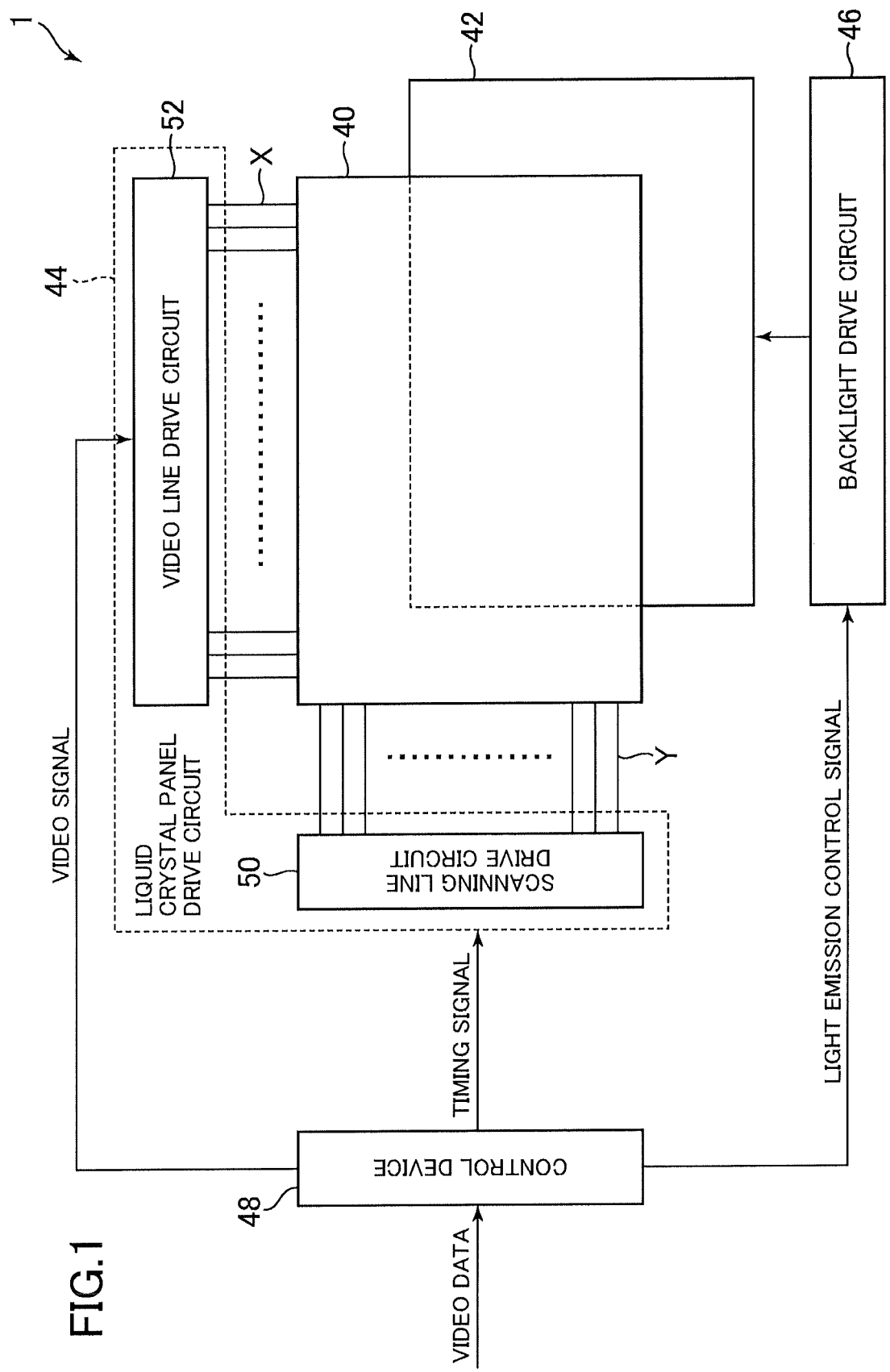
FIG. 1 is a schematic diagram illustrating a configuration of a liquid crystal display device according to an embodiment of the present invention.

Hereinafter, an embodiment of the present invention is described with reference to the accompanying drawings. FIG. 1 is a schematic diagram illustrating a configuration of a liquid crystal display device 30 according to the embodiment of the present invention.

As illustrated in FIG. 1, the liquid crystal display device 30 includes a liquid crystal panel 40, a backlight unit 42, a liquid crystal panel drive circuit 44, a backlight drive circuit 46, and a control device 48. The liquid crystal panel drive circuit 44 includes a scanning line drive circuit 50 and a video line drive circuit 52.

The liquid crystal panel 40 is a laminate including a pair of transparent glass substrates, liquid crystal sandwiched therebetween, and polarizing plates respectively adhered to a display surface-side surface of one of the pair of glass substrates sandwiching the liquid crystal and a backlight unit-side surface of the other glass substrate. The liquid crystal panel 40 has a substantially rectangular plate shape.

On the surface on the liquid crystal side of the glass substrate on the backlight unit side (referred to as TFT substrate), thin film transistors (TFTs) are disposed in matrix so as to correspond to a pixel array. Further, on the TFT substrate, a plurality of video signal lines X and a plurality of scanning signal lines Y are formed so as to be orthogonal to one another. The scanning signal line Y is provided for each horizontal row of the TFTs, and is connected in common to gates of the plurality of TFTs in the each horizontal row. The video signal line X is provided for each vertical row of the TFTs, and is connected in common to sources of the plurality of TFTs in the each vertical row. Further, a drain of each TFT is connected to a pixel electrode disposed in a pixel region corresponding to the each TFT.

The TFTs are ON/OFF controlled on a horizontal row basis in accordance with a scanning signal applied to the scanning signal line Y. Each of the ON-state TFTs in the horizontal row sets the pixel electrode to have a potential corresponding to a video signal applied to the video signal line X. Based on the potential set to each of the pixel electrodes, the liquid crystal panel 40 controls the orientation of the liquid crystal for each pixel to change the transmittance of light entering from the backlight unit 42, to thereby form an image on the display surface.

Note that, a color filter is formed on the glass substrate on the display surface side, thereby enabling color display of an image.

The backlight unit 42 is disposed on the rear surface side of the liquid crystal panel 40. The backlight unit 42 is a planar light source device according to the present invention, and irradiates the rear surface of the liquid crystal panel 40 with light. The planar shape of the backlight unit 42 is a rectangle corresponding to the liquid crystal panel 40, the size of which corresponds to the liquid crystal panel 40. The configuration of the backlight unit 42 is described in detail below.

The scanning line drive circuit 50 is connected to the plurality of scanning signal lines Y formed on the TFT substrate. The scanning line drive circuit 50 sequentially selects the scanning signal lines Y in accordance with a timing signal input from the control device 48, and applies the selected scanning signal line Y with a voltage for turning ON the TFTs.

The video line drive circuit 52 is connected to the plurality of video signal lines X formed on the TFT substrate. In synchronization with the selection of the scanning signal line Y by the scanning line drive circuit 50, the video line drive circuit 52 applies each of the TFTs connected to the selected scanning signal line Y with a voltage corresponding to the video signal indicating a gradation value of each pixel. In this manner, the video signal is written into the pixels corresponding to the selected scanning signal line Y. This operation corresponds to horizontal scanning of a raster image. Note that, the above-mentioned operation of the scanning line drive circuit 50 corresponds to vertical scanning.

The backlight drive circuit 46 causes a plurality of LEDs arrayed in the backlight unit 42 to emit light at a timing and a brightness corresponding to a light emission control signal input from the control device 48. The backlight drive circuit 46 includes an LED drive circuit for supplying a drive voltage of the LED, as well as a circuit for performing feedback control by monitoring whether or not a current supplied to the LED has the magnitude corresponding to the brightness instructed by the light emission control signal.

The control device 48 includes an arithmetic processing circuit such as a central processing unit (CPU) and a memory such as a read only memory (ROM) and a random access memory (RAM). The control device 48 receives video data as its input. In the case where the liquid crystal display device 30 constitutes a television set, the video data is received by an antenna (not shown) or a tuner (not shown). Further, the video data may be input from another device such as a video reproduction device. The control device 48 executes various kinds of processing by the CPU reading and executing a program stored in the memory. Specifically, the control device 48 performs various kinds of image signal processing, including color adjustment, on the video data to generate the video signal indicating the gradation value of each pixel, and outputs the generated video signal to the video line drive circuit 52. Further, based on the input video data, the control device 48 generates a timing signal for synchronizing the video line drive circuit 52, the scanning line drive circuit 50, and the backlight drive circuit 46, and outputs the generated timing signal to the respective drive circuits. As the light emission control signal supplied to the backlight drive circuit 46, the control device 48 generates a signal for controlling the brightness of the LED based on the input video data in addition to the timing signal.

Figure 2:
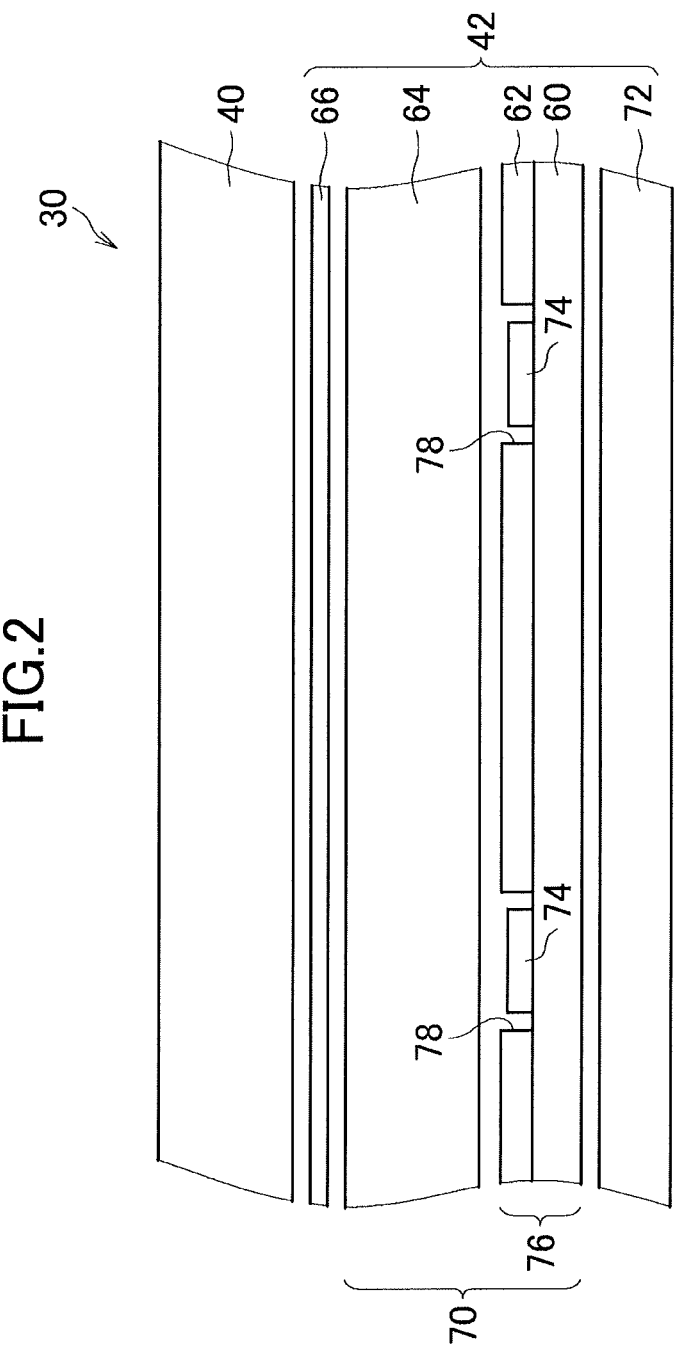
FIG. 2 is a schematic cross-sectional view illustrating a partial vertical cross section of the liquid crystal display device according to the embodiment of the present invention.

FIG. 2 is a schematic cross-sectional view illustrating a partial vertical cross section of the liquid crystal display device 30. The backlight unit 42 includes a laminate 70 and a frame 72. The laminate 70 includes an LED substrate 60, a reflective sheet 62, a light guide plate 64, and an optical sheet group 66, which are stacked on one another. The frame 72 has a box shape (not shown) for accommodating the laminate 70 inside. The liquid crystal panel 40 is overlapped on a front surface of the backlight unit 42.

The backlight unit 42 is a direct type backlight unit, and a plurality of LED elements 74 are mounted on the surface of the LED substrate 60 on the light guide plate 64 side in the form of a matrix, for example. The LED element 74 has an upward lighting type package, and a light emitting body 80 is buried at an upper surface thereof (the surface opposed to the light guide plate 64). For example, the light emitting body 80 has a pseudo-white configuration including a blue LED chip and a yellow fluorescent substance that seals the LED chip from above. With this configuration, blue color light of the LED and yellow color light emitted from the fluorescent substance excited by the LED light are mixed together, to thereby obtain white color.

The LED substrate 60 is made of, for example, a material having low thermal expansion, similarly to the glass substrates of the liquid crystal panel 40. As an example, a glass epoxy substrate can be used. On the LED substrate 60, a conductor pattern for supplying power to the LED elements 74 is formed. For example, in order to enable local dimming control, the LED substrate 60 includes a conductor pattern capable of driving the LED elements 74 independently, or alternatively, a two-dimensional array of the LED elements 74 is divided into a plurality of regions and the LED substrate 60 includes a conductor pattern capable of driving the LED elements 74 for each of the divided regions.

The reflective sheet 62 is a sheet-like member whose surface has the property of reflecting light. The reflective sheet 62 constitutes a light emitting portion 76 together with the LED substrate 60 and the LED elements 74. The light emitting portion 76 is positioned behind the light guide plate 64 and has an element array surface on which a plurality of light emitting elements are arrayed. Specifically, the reflective sheet 62 is placed or adhered onto the surface of the LED substrate 60 on the side where the LED elements 74 are mounted.

In the reflective sheet 62, a plurality of through holes 78 are formed corresponding to the positions of the LED elements 74 on the LED substrate 60. In the state in which the reflective sheet 62 is laminated on the LED substrate 60, the through hole 78 forms a recess portion in the surface of the light emitting portion 76 on which the LED elements 74 are arrayed. The LED element 74 mounted on the LED substrate 60 is accommodated within the through hole 78. In other words, the thickness of the reflective sheet 62 is set so that the surface of the reflective sheet 62 in the light emitting portion 76 may be at the height equal to or higher than the upper surface of the LED element 74 mounted on the LED substrate 60. For example, the thickness of the LED element 74 can be set to 1 mm or less. For example, the reflective sheet 62 can be thickened more than the LED element 74 by coating the surface of a foamed base with a metal film or using an ultrafine foamed reflective plate.

Note that, an opening of the through hole 78 is set to be larger than the planar shape of the LED element 74. In this case, in consideration of the difference in thermal expansion between the LED substrate 60 and the reflective sheet 62, a gap may be provided between the LED element 74 and a side surface of the through hole 78. On the other hand, from the viewpoint of ensuring reflection efficiency obtained by the reflective sheet 62, it is desired that the opening of the through hole 78 be smaller. Further, in the case where a plurality of the LED elements 74 are arranged at one point in the two-dimensional array, the through hole 78 may be provided so as to accommodate the plurality of LED elements 74 together at the one point. In the case where the LED elements 74 are arrayed along a straight line at narrow intervals, an elongated groove along the straight line may be set as the through hole 78.

On a front surface of the light emitting portion 76, the light guide plate 64 is disposed. The light emitting portion 76 irradiates the light guide plate 64 with light from the LED element 74, and reflects light leaking from the rear surface of the light guide plate 64 by means of the reflective sheet 62 so as to return the light to the light guide plate 64. In this manner, the light emitting portion 76 improves light emission efficiency of the backlight unit 42.

The light guide plate 64 is a flat plate formed of a transparent resin, such as acrylic, polystyrene, and polycarbonate. The light guide plate 64 basically has a uniform thickness, and has both flat surfaces. The flat surface as used herein means a surface having no relatively large irregularities, such as the recess portions 8 and 10 provided in the above-mentioned conventional light guide plate 2.

The rear surface of the light guide plate 64 is a surface on which light is incident from the light emitting portion 76 (incident-side surface), and the front surface thereof is a surface from which light exits toward the liquid crystal panel 40 (exit-side surface). The light guide plate 64 is structured so that the LED light entering from the rear surface may propagate in the direction along the plane while being repeatedly totally reflected on the front and rear surfaces, and is also structured to cause diffusive reflection on the rear surface side so that light may exit from the front surface at uniform intensity.

The optical sheet group 66 includes a diffusion sheet for diffusing light which exits from the surface of the light guide plate 64 so as to improve the uniformity of light intensity within the light emitting surface, and a prism sheet for condensing light which exits from the diffusion sheet to the front surface in various directions, with the direction perpendicular to the plane being the center, so as to improve the brightness on the front of the light emitting surface.

Figure 3:
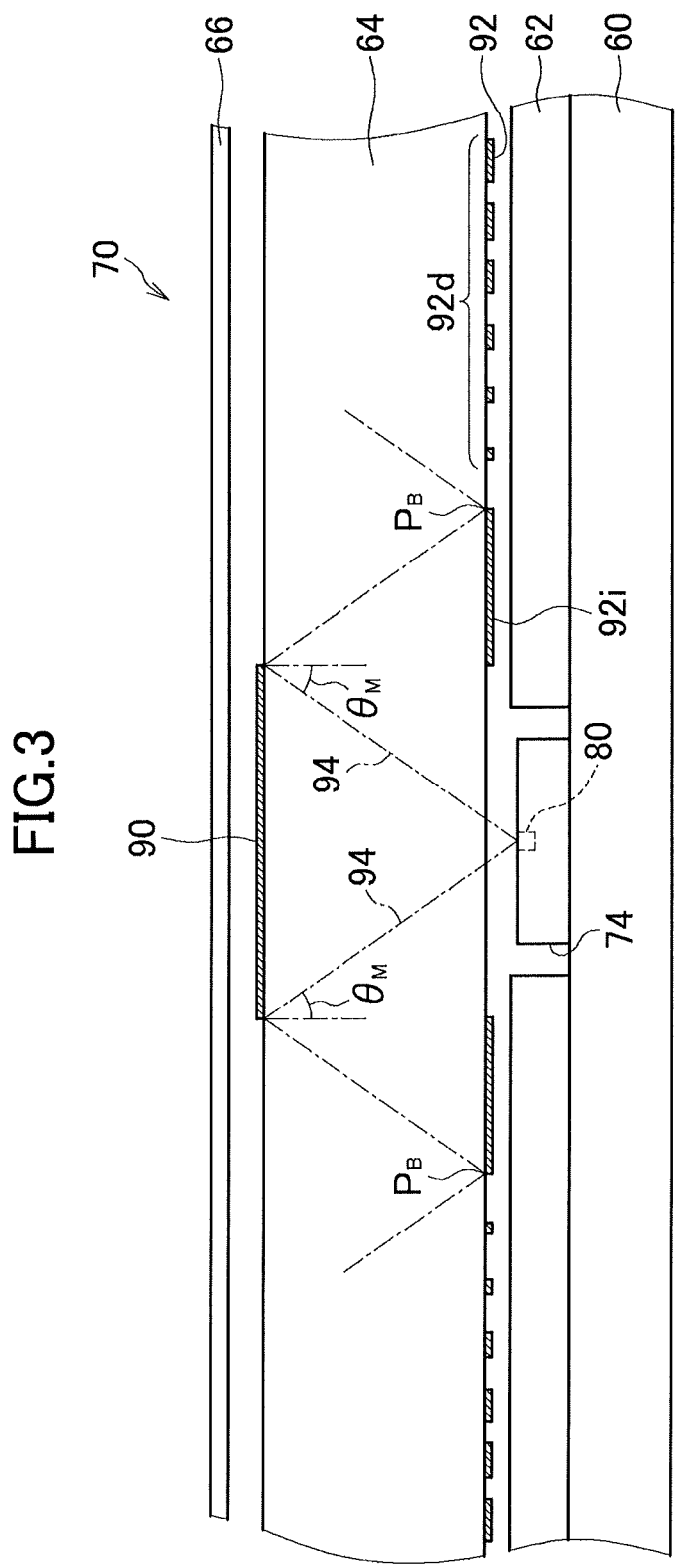
FIG. 3 is a schematic cross-sectional view illustrating a partial vertical cross section of a laminate constituting a backlight unit according to the embodiment of the present invention.
Figure 4:
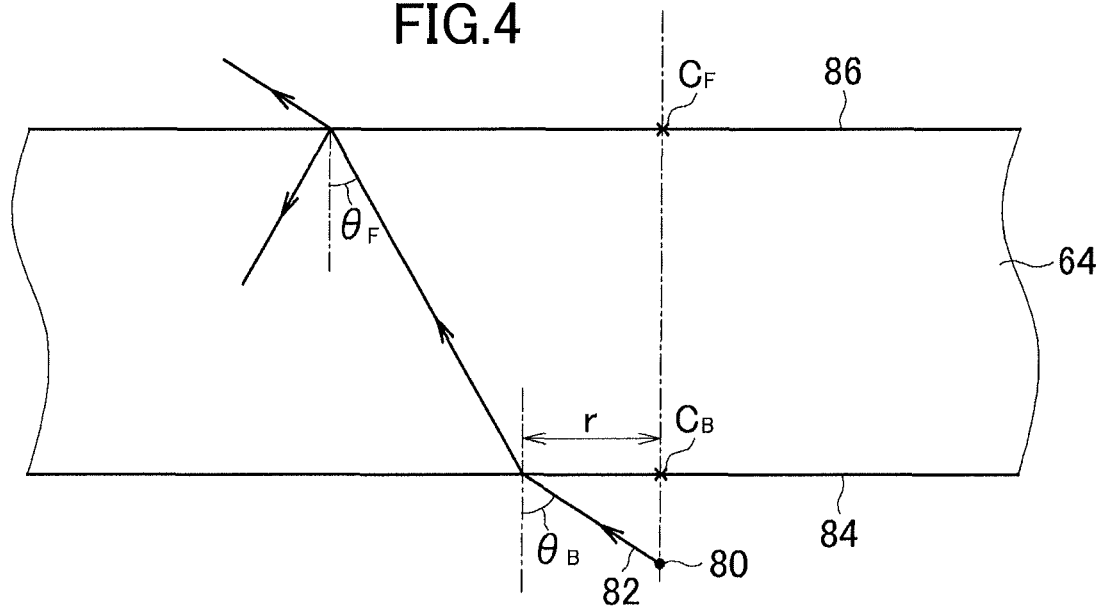
FIG. 4 is an explanatory diagram illustrating an incident angle of light emitted from a light emitting body with respect to a rear surface of a light guide plate and an incident angle of the light with respect to a front surface of the light guide plate.

FIG. 3 is a schematic cross-sectional view illustrating a partial vertical cross section of the laminate 70 constituting the backlight unit 42. FIG. 3 illustrates one LED element 74 and its vicinity region in an enlarged scale. The LED element 74 of FIG. 3 includes the light emitting body 80 at the center of the upper surface thereof. The light emitting body 80 is substantially a point light source. In other words, light emitted from the light emitting body 80 spreads radially about the light emitting body 80. FIG. 4 is an explanatory diagram illustrating an incident angle $\theta_B$ of light 82 emitted from the light emitting body 80 with respect to a rear surface 84 (incident-side surface) of the light guide plate 64 and an incident angle $\theta_F$ of the light 82 with respect to a front surface 86 (exit-side surface) of the light guide plate 64. The incident angle $\theta_B$ with respect to the rear surface 84 is 0° at a point $C_B$ directly above the light emitting body 80 (hereinafter, referred to as directly-above point $C_B$). As a distance r between the directly-above point $C_B$ and a point on the rear surface 84 is larger, the incident angle $\theta_B$ at the point becomes larger. Further, as the incident angle $\theta_B$ at which the light from the LED element 74 enters the rear surface 84 is smaller, the incident angle $\theta_F$ at which the light that has entered the light guide plate 64 enters the front surface 86 becomes smaller. In other words, when the incident angle $\theta_B$ with respect to the rear surface 84 is smaller than a predetermined angle ($\alpha$ in this case), the corresponding incident angle $\theta_F$ with respect to the front surface 86 is smaller than a critical angle $\theta_M$. Therefore, a component that does not satisfy total reflection conditions and transmits to the outside of the light guide plate 64 from the front surface 86 is generated.

Such a region of the front surface 86 in which the total reflection conditions are not satisfied (non-total reflection region) is present in a circle with a position $C_F$ as the center, which is in front of the light emitting body 80 being a point light source. In the non-total reflection region, the light from the light emitting body 80 directly transmits through the light guide plate 64 and exits toward the liquid crystal panel 40 side. Accordingly, the light is emitted from the non-total reflection region at a higher brightness than in a total reflection region, which is positioned outside the non-total reflection region and from which light is emitted after being diffused and reflected on the rear surface side. Thus, there is a disadvantage that the uniformity of in-plane light emission intensity is impaired. In order to prevent this problem, the light guide plate 64 is subjected to processing so that the non-total reflection region may reflect at least a part of the incident light. In this embodiment, as the processing, a white reflective film 90 is formed on the front surface of the light guide plate 64 by printing. The white reflective film 90 reflects the incident light onto the non-total reflection region at high diffusive reflectance so as to return the light back to the light guide plate 64, to thereby generate, for example, a component that propagates inside the light guide plate 64 while being totally reflected on the rear surface 84 and the front surface 86.

Note that, as the distance between the light emitting body 80 and the rear surface 84 of the light guide plate 64 is smaller, the non-total reflection region becomes smaller, and the white reflective film 90 can be reduced in area. From this viewpoint, it is preferred to dispose the light emitting body 80 in intimate contact with the rear surface 84 of the light guide plate 64. For this arrangement, for example, the height of the upper surface of the LED element 74 and the height of the surface of the reflective sheet 62 may be set equal to each other.

FIGS. 5 to 9 are schematic plan views of the front surface of the light guide plate 64, illustrating examples of a pattern of the white reflective film 90. In each of the drawings, the hatched portion is a region in which the white reflective film 90 is formed (formation region). In the pattern illustrated in FIG. 5, the white reflective film 90 is formed in the entire non-total reflection region. In the backlight unit 42 employing the pattern illustrated in FIG. 5, light which exits diagonally from a peripheral region of a non-total reflection region on the front surface of the light guide plate 64 to the front of the non-total reflection region incidents on the optical sheet group 66 and illuminates onto the liquid crystal panel 40 opposed to the non-total reflection region via the optical sheet group 66. The amount of incident light from the peripheral region to the front of the non-total reflection region can be varied through the adjustment of an in-plane intensity distribution of scattered and reflected light on the rear surface side of the light guide plate 64.

Figure 5:
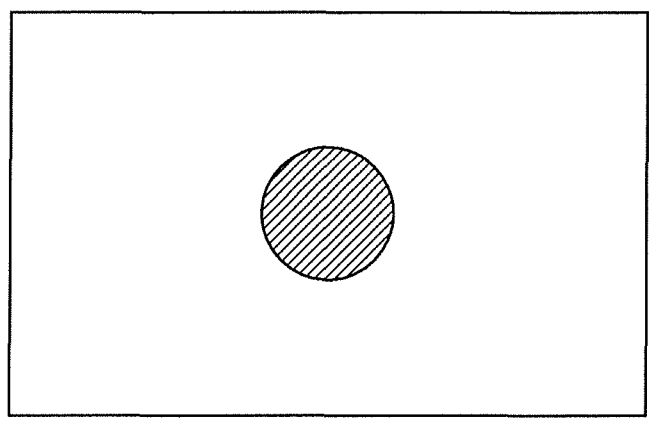
FIG. 5 is a schematic plan view of the front surface of the light guide plate, illustrating an example of a pattern of a white reflective film formed on the front surface of the light guide plate.
Figure 6:
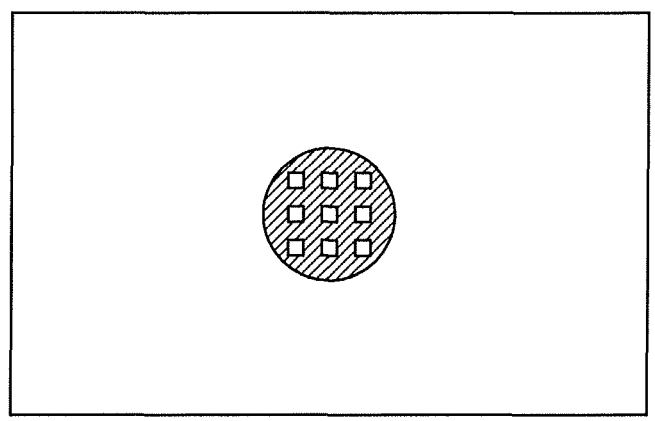
FIG. 6 is a schematic plan view of the front surface of the light guide plate, illustrating another example of the pattern of the white reflective film formed on the front surface of the light guide plate.
Figure 7:
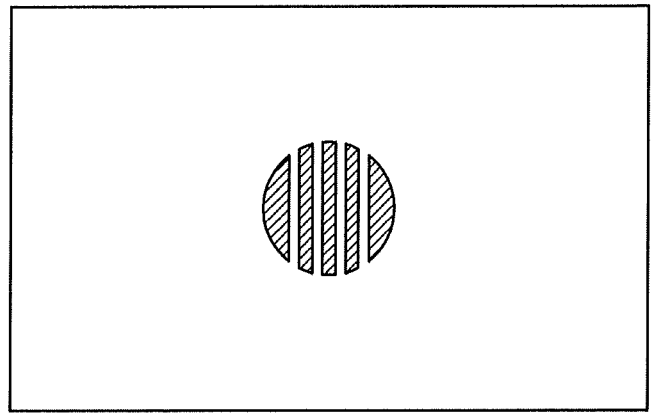
FIG. 7 is a schematic plan view of the front surface of the light guide plate, illustrating still another example of the pattern of the white reflective film formed on the front surface of the light guide plate.
Figure 8:
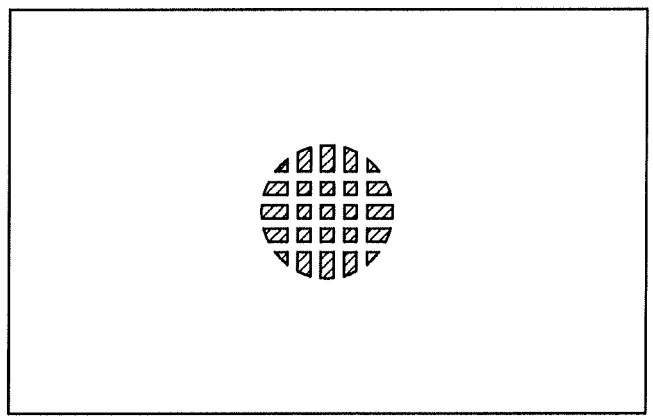
FIG. 8 is a schematic plan view of the front surface of the light guide plate, illustrating yet another example of the pattern of the white reflective film formed on the front surface of the light guide plate.
Figure 9:
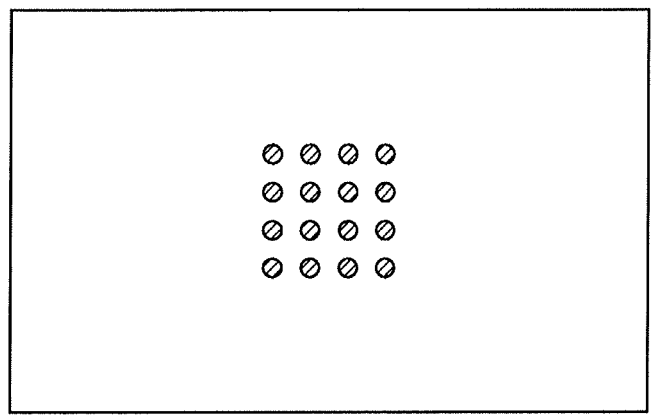
FIG. 9 is a schematic plan view of the front surface of the light guide plate, illustrating a further example of the pattern of the white reflective film formed on the front surface of the light guide plate.

Here, in the pattern illustrated in FIG. 5, for example, when the diameter of the non-total reflection region is large, the amount of light emission from a portion corresponding to the non-total reflection region cannot be ensured by the above-mentioned adjustment, with the result that the portion may be darkened in the entire backlight unit 42. In this case, as a solution, it is possible to adopt a configuration in which a part of the light entering the non-total reflection region from the LED element 74 is scattered and reflected into the light guide plate 64 by the white reflective film 90 while the remaining light is transmitted to the outside of the light guide plate 64. In this configuration, the white reflective film 90 is formed only in a part of the non-total reflection region, for example. FIGS. 6 to 9 are examples of the pattern in which the white reflective film 90 is formed only in a part of the non-total reflection region. The amount of light emission of the light emitting portion 76 from a portion corresponding to the non-total reflection region can be increased by increasing the ratio of a region in which the white reflective film 90 is not formed (non-formation region). The formation region of the white reflective film 90 is designed so that the light emission amount may have uniform light emission intensity in the entire backlight unit 42. In this case, it is preferred that the formation regions or the non-formation regions of the white reflective film 90 be disposed in the non-total reflection region in a dispersed manner.

Note that, the configuration in which a part of the light entering the non-total reflection region from the LED element 74 is transmitted is achieved by the above-mentioned method of forming the white reflective film 90 only in a part of the non-total reflection region and also by, for example, thinning the white reflective film 90 or changing the material thereof so as to impart a certain degree of permeability to a scattering and reflective film itself formed in the non-total reflection region. Further, by adjusting the surface roughness of the light guide plate 64 by forming a large number of fine irregularities on the surface thereof, it is possible to scatter a part of the light from the LED element 74 and transmit the remaining light. The roughened surface may be formed in the entire non-total reflection region. Further, also in the above-mentioned configuration in which the white reflective film 90 is not formed in a part of the non-total reflection region, by roughening the surface of the light guide plate 64 in the region in which the white reflective film 90 is not formed, it is also possible to obtain the scattered and reflected light and scatter the transmitted light.

The above-mentioned processing may be performed on a region of the front surface 86 including the non-total reflection region, that is, a region wider than the non-total reflection region. Specifically, the non-total reflection region, which has a predetermined positional relationship with reference to the light emitting body 80, is deviated within the front surface 86 due to thermal expansion of the light guide plate 64. To address the problem, the range to be subjected to processing such as forming the white reflective film 90 can be set as a region where the non-total reflection region can shift on the front surface 86 due to the thermal expansion of the light guide plate 64. The region encompassing the non-total reflection region against the thermal expansion can be set in consideration of the movement width and direction of the light guide plate 64 caused by the thermal expansion at the position of each of the LED elements 74 arrayed two-dimensionally in the light emitting portion 76. Note that, for example, if the light guide plate 64 is supported by the frame 72 so that the center of the light guide plate 64 is not moved relative to the light emitting portion 76, the region including the non-total reflection region is set smaller for the LED element 74 which is closer to the center.

Figure 10:
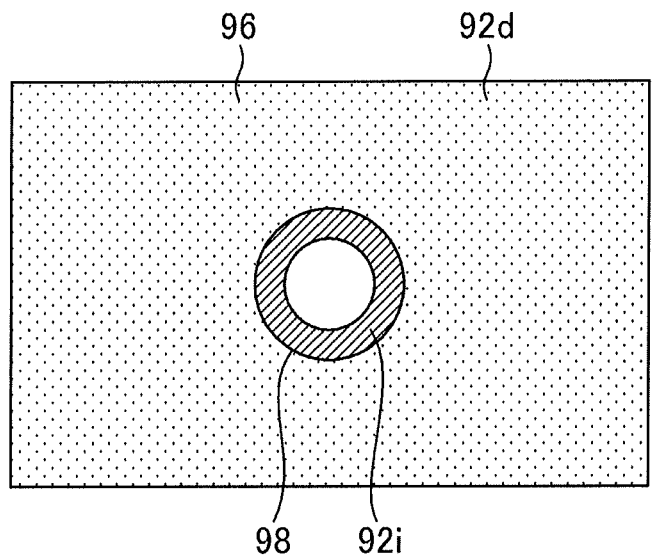
FIG. 10 is a schematic plan view of the rear surface of the light guide plate, illustrating an example of a pattern of a white reflective film formed on the rear surface of the light guide plate.
Figure 11:
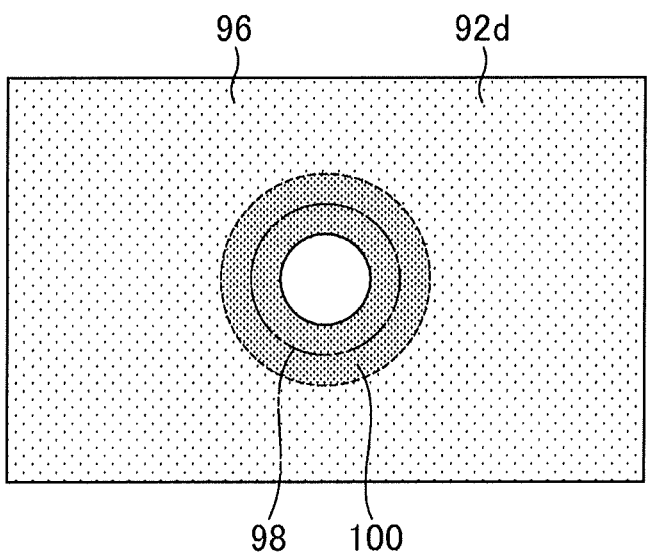
FIG. 11 is a schematic plan view of the rear surface of the light guide plate, illustrating another example of the pattern of the white reflective film formed on the rear surface of the light guide plate.
Figure 12:
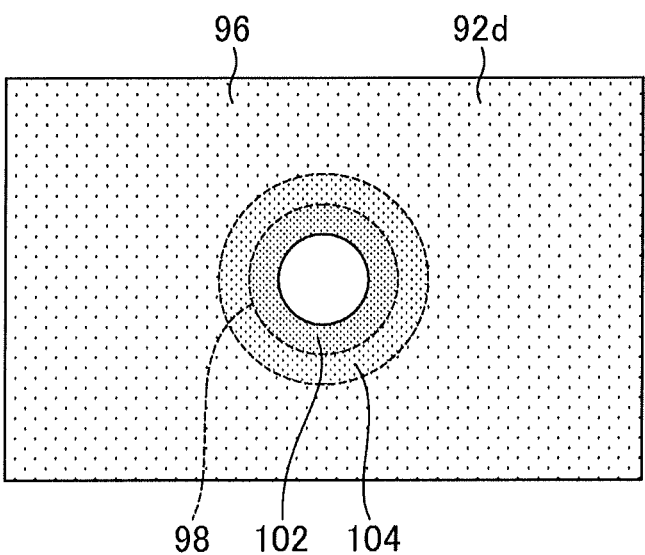
FIG. 12 is a schematic plan view of the rear surface of the light guide plate, illustrating still another example of the pattern of the white reflective film formed on the rear surface of the light guide plate.
Figure 13:
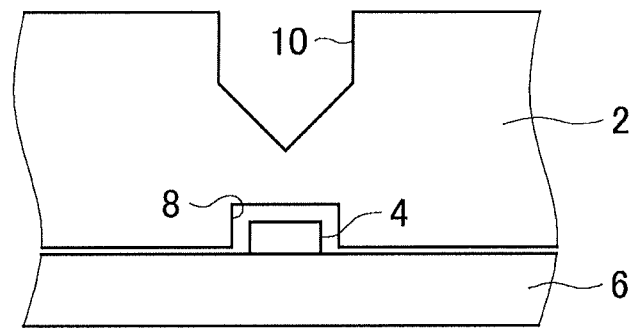
FIG. 13 is a vertical cross-sectional view schematically illustrating a structure of a conventional direct type planar light source device.
Figure 14:
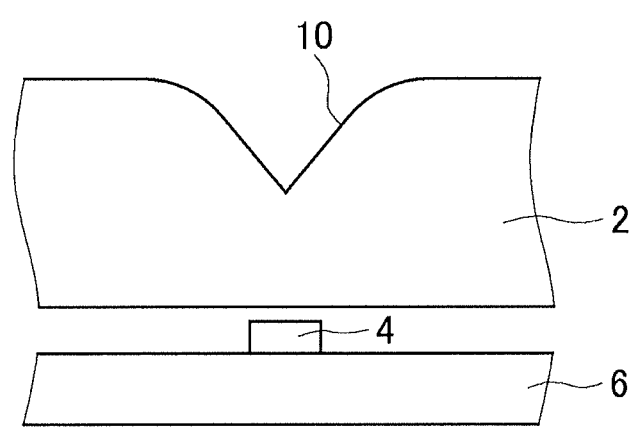
FIG. 14 is a vertical cross-sectional view schematically illustrating another structure of the conventional direct type planar light source device.
Figure 15:
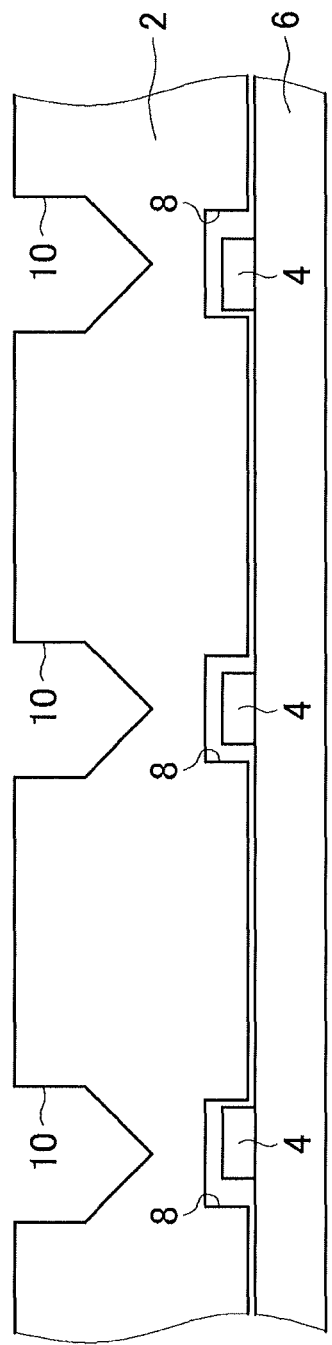
FIG. 15 is a vertical cross-sectional view schematically illustrating a state in which thermal expansion occurs in a light guide plate of the structure illustrated in FIG. 13.

In the above, the processing to be performed on the exit-side surface of the light guide plate 64 has been described. On the other hand, as described above, the incident-side surface of the light guide plate 64 has the structure of causing diffusive reflection so that light may exit from the exit-side surface at uniform intensity. In this embodiment, this structure is formed by processing performed on the incident-side surface. Specifically, as the processing, a white reflective film 92 is formed on the rear surface 84 of the light guide plate 64 by printing. Similarly to the white reflective film 90 formed on the front surface 86, the white reflective film 92 reflects incident light at high diffusive reflectance so as to return the light back to the light guide plate 64. The white reflective film 92 is formed in a pattern so as to obtain uniform light emission intensity from the front surface 86. FIGS. 10 to 12 are schematic plan views of the rear surface of the light guide plate 64, illustrating examples of the pattern of the white reflective film 92.

The white reflective film 92 is formed so that a surface density thereof is changed depending on the distance of the light emitting body 80 from the directly-above point $C_B$.

Light beams 94 illustrated in FIG. 3 are light beams which have the incident angle $\theta_F$ equal to the critical angle $\theta_M$, of light beams entering the front surface 86 from the LED element 74. A point $P_B$ is a point at which the light beam 94 enters the rear surface 84 for the first time after being reflected on the front surface 86. Here, a region of the rear surface 84 which is further with respect to the point $P_B$ is referred to as outside region 96, and a region of the rear surface 84 which is closer with respect to the point $P_B$ is referred to as inside region 98.

A light beam whose incident angle $\theta_F$ is larger than the critical angle $\theta_M$ illuminates the outside region 96 on the rear surface 84. When not considering scattered and reflected light from the white reflective film 90 formed on the front surface 86 in the non-total reflection region but considering only the light whose incident angle $\theta_F$ is larger than the critical angle $\theta_M$, in order to obtain light emission having a uniform intensity distribution from the front surface 86 opposed to the outside region 96, it is necessary to increase the surface density of the white reflective film 92 more to enhance the intensity of scattering and reflection as the distance from the point $P_B$ is larger. In the example illustrated in FIG. 3 and FIG. 10, a dot pattern 92d in which dots are distributed is formed in the outside region 96 as the white reflective film 92. In this case, by increasing the size of the dots or increasing the distribution density of the dots as the distance from the point $P_B$ is larger, it is possible to increase the surface density of the white reflective film 92 as the distance from the point $P_B$ is larger.

The white reflective film 90 formed in the non-total reflection region less affects the outside region 96 as the distance from the point $P_B$ is larger. That is, the intensity of the scattered and reflected light from the white reflective film 90 becomes weaker as the distance from the point $P_B$ is larger.

The inside region 98 on the rear surface 84 is illuminated with the scattered and reflected light from the white reflective film 90 of the front surface 86. In order to allow the scattered and reflected light to exit from the front surface 86, in the example illustrated in FIG. 3 and FIG. 10, a pattern 92i is formed in the inside region 98 as the white reflective film 92. The pattern 92i with respect to the light emitting body 80 being a point light source is formed into a doughnut shape whose center portion is opened as illustrated in FIG. 10. The center portion needs to be provided with a region in which the white reflective film 92 is not formed, in order not to prevent the incidence of light into the light guide plate 64 from the light emitting body 80. Note that, scattered and reflected light from a point within the inside region 98 less contributes to the intensity of light emission of the front surface 86 opposed to the inside region 98 as the point is more inward from the position immediately below the edge of the white reflective film 90. Accordingly, the position of the inner edge of the pattern 92i is set in consideration of advantages and disadvantages from the viewpoints described above.

The pattern 92i illustrated in FIG. 10 is obtained by forming the white reflective film 92 in the entire region of the doughnut shape. However, the formation density of the pattern 92i can be adjusted so that the light emission intensity at the front surface 86 corresponding to the doughnut-shaped region may have the same level as that in other portions. For example, in the case where a dot pattern is formed as the pattern 92i, the formation density of the dot pattern can be adjusted by the distribution density of the dots or the size of the dots similarly to the outside region 96. For example, in a configuration illustrated in FIG. 11, a dot pattern 100 made of the white reflective film 92 is formed into a doughnut shape. Alternatively, in a configuration illustrated in FIG. 12, the surface density of the white reflective film 92 formed by a doughnut-shaped outer dot pattern 104 is set lower than the surface density of the white reflective film 92 formed by a doughnut-shaped inner dot pattern 102. In this way, the surface density may be set so as to have a stepwise change or a continuous tone within the inside region 98 or in a part of the range from the inside region 98 to the outside region 96.

On the other hand, if the density of the pattern 92i formed in the inside region 98 is decreased, the amount of scattered and reflected light that enters the front of the non-total reflection region from the inside region 98 is reduced. The resultant reduction in light emission intensity in front of the non-total reflection region can be compensated for by forming the white reflective film 90 into a pattern that transmits a part of light as illustrated in FIGS. 6 to 9 and using the transmitted light.

In the above, the matters regarding the pattern setting of the white reflective film 90 on the front surface 86 and the pattern setting of the white reflective film 92 on the rear surface 84 in the outside region 96 and the inside region 98 have been described qualitatively. As understood from the description, those patterns each affect the setting of the in-plane intensity distribution of light emission of the light emitting portion 76. Further, various factors, including the material and thickness of the light guide plate 64 and the scattering characteristics of the white reflective films 90 and 92, affect the determination of those patterns. The patterns of the white reflective films 90 and 92 are set in consideration of the above so that the planar light intensity of the light emitting portion 76 becomes uniform. Specifically, those patterns can be set appropriately by executing simulation using a computer, for example.

Note that, in the above-mentioned embodiment, the light emitting elements mounted in the light emitting portion 76 are the LED elements 74 each including the light emitting body 80 which is a point light source. However, the light emitting elements may be linear light sources, and may be other light emitting elements than the LEDs. For example, a CCFL may be accommodated inside a linear groove which is formed in the surface of the light emitting portion 76 by an opening portion of the reflective sheet, for example.

The above-mentioned liquid crystal display device 30 is used by being connected to an external device or being incorporated into a television set or a personal computer, for example. The television set includes the liquid crystal display device 30 as an image display portion, as well as other components such as a tuner, an external device interface circuit, a processing circuit for various signals, and a speaker.

According to the planar light source device of the present invention and the liquid crystal display device and the television set that use the planar light source device described above, the unevenness of light emission intensity during local dimming control is reduced. Even if the light guide plate undergoes thermal expansion, the light guide plate does not collide with a light emitting element. Besides, the uniformity of the light emission intensity is maintained.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A planar light source device, comprising:
   a light emitting portion including an element array surface on which a plurality of light emitting elements are arrayed; and
   a light guide plate having both flat surfaces, the light guide plate being stacked on the element array surface and structured to cause light which is emitted by the plurality of light emitting elements to an incident-side surface to propagate inside the light guide plate so as to extract the light from an exit-side surface which is opposite to the incident-side surface, wherein:

the element array surface of the light emitting portion has a plurality of recess portions for accommodating the plurality of light emitting elements therein;

a non-total reflection region within the exit-side surface of the light guide plate is processed so that at least a part of light emitted from the plurality of light emitting elements toward the exit-side surface is reflected, the non-total reflection region being positioned to oppose each of the plurality of light emitting elements and in the non-total reflection region an incident angle of the light being smaller than a critical angle;

the incident-side surface of the light guide plate is processed so as to diffuse and reflect light;

wherein the light guide plate comprises white reflective films formed on the exit-side surface and the incident-side surface as the processing for the exit-side surface and the incident-side surface;

wherein the white reflective film formed on the incident-side surface changes in surface density depending on a distance from each of the plurality of light emitting elements so that intensity of light emission from the exit-side surface becomes uniform irrespective of the distance; and wherein an area covered by the white reflective film formed on the exit-side surface in the non-total reflection region is less than the non-total reflection region.

2. The planar light source device according to claim 1, wherein:

the light emitting portion comprises:

a substrate for mounting the plurality of light emitting elements thereon; and a reflective sheet, which is laminated on the substrate and has a surface that reflects light; and the reflective sheet has a thickness larger than a thickness of each of the plurality of light emitting elements, and has through holes formed in a surface thereof corresponding to positions of the plurality of light emitting elements, the through holes constituting the plurality of recess portions, respectively.

3. The planar light source device according to claim 1, wherein:

the white reflective film formed on the exit-side surface in the non-total reflection region has a pattern of transmitting a part of light emitted from each of the plurality of light emitting elements, and reflecting remaining light; and the white reflective film formed on the incident-side surface changes a surface density thereof depending on a distance from the each of the plurality of light emitting elements so that intensity of light emission from the exit-side surface including the transmitted light from the non-total reflection region becomes uniform irrespective of the distance.

4. The planar light source device according to claim 1, wherein the plurality of light emitting elements comprise light emitting diodes.

5. The planar light source device according to claim 1, wherein the processing for the non-total reflection region is performed on a region where the non-total reflection region can shift on the exit-side surface due to thermal expansion of the light guide plate.

6. A liquid crystal display device, comprising:

the planar light source device according to claim 1; and a liquid crystal panel for performing display by being irradiated with light from the planar light source device.

7. A television set, comprising the liquid crystal display device according to claim 6.

* * * * *